(12) United States Patent
Weimer et al.

(10) Patent No.: US 6,264,278 B1
(45) Date of Patent: Jul. 24, 2001

(54) ADJUSTABLE FOOTREST FOR CAR SEAT

(76) Inventors: Irene A. Weimer, 13462 B Sabal Palm Ct., Del Ray Beach, FL (US) 33484; April L. Weimer, 12615 Lakeshore Dr., Auburn, CA (US) 95602

( * ) Notice: Subject to any disclaimer, the term of this patent is extended or adjusted under 35 U.S.C. 154(b) by 0 days.

(21) Appl. No.: 09/615,085

(22) Filed: Jul. 12, 2000

Related U.S. Application Data

(60) Provisional application No. 60/147,356, filed on Aug. 6, 1999.

(51) Int. Cl.[7] .................................................. A47C 20/00
(52) U.S. Cl. ............................. 297/423.26; 297/423.36; 297/423.19; 297/256.11
(58) Field of Search ..................... 297/423.19, 423.26, 297/423.29, 423.3, 423.34, 423.36, 423.38, 423.4, 250.1, 256.1, 256.11

(56) References Cited

U.S. PATENT DOCUMENTS

| D. 341,969 | 12/1993 | Kroah | D6/333 |
|---|---|---|---|
| 1,501,443 | * 7/1924 | Ellis | 297/423.38 X |
| 2,278,078 | * 3/1942 | Kahn | 297/423.38 X |
| 2,308,315 | 1/1943 | Smith | 155/10 |
| 2,683,482 | * 7/1954 | Puls | 297/423.38 X |
| 4,205,877 | 6/1980 | Ettridge | 297/321 |
| 4,274,674 | 6/1981 | Deloustal | 297/250 |
| 4,391,453 | * 7/1983 | Glaser | 297/423.36 X |
| 4,596,420 | 6/1986 | Vaidya | 297/233 |
| 4,762,331 | 8/1988 | Tucker et al. | 280/30 |
| 4,858,997 | 8/1989 | Shubin | 297/487 |
| 5,228,745 | 7/1993 | Hazel | 297/229 |
| 5,437,496 | 8/1995 | Rickard | 297/283.2 |
| 5,458,399 | * 10/1995 | Gezari et al. | 297/423.38 X |
| 5,505,519 | 4/1996 | Natt | 297/250.1 |
| 5,524,964 | 6/1996 | Weimersheimer | 297/256.12 |
| 5,836,652 | * 11/1998 | Wexler et al. | 297/423.38 X |
| 6,126,236 | * 10/2000 | Wu | 297/423.38 X |

FOREIGN PATENT DOCUMENTS

| 1182752 | 2/1968 | (GB) | B60N/1/12 |
|---|---|---|---|
| WO 86/02050 | 4/1986 | (WO) | B60N/1/12 |

* cited by examiner

Primary Examiner—Laurie K. Cranmer
(74) Attorney, Agent, or Firm—Richard C. Litman

(57) ABSTRACT

An adjustable footrest for a car seat. The adjustable footrest can be permanently attached, with screws and bolts, to a given car seat. The adjustable footrest has a vertical plate and a horizontal plate that can be swung into place with the use of ball bearing turning spools. The horizontal plate can be further adjusted in relation to the vertical plate with the use of a spring loaded dowel and a plurality of alignment apertures on the vertical plate. This enables the adjustable footrest to adjust to each individual child that sits in it.

3 Claims, 6 Drawing Sheets

ADJUSTABLE FOOTREST FOR CAR SEAT

CROSS-REFERENCE TO RELATED APPLICATION

This application claims the benefit of U.S. Provisional Patent Application Ser. No. 60/147,356, filed Aug. 6, 1999.

BACKGROUND OF THE INVENTION

1. Field of the Invention

The present invention relates to an adjustable footrest for a small child's car seat.

2. Description of the Related Art

Children's car seats are an important part of automotive safety. Designed to secure a baby or small child, these car seats are subject to federal guidelines for proper usage and installation. Car seats are well-known in the related art and are provided with a variety of features that insure a child's safety in the event of an automobile accident.

U.S. Pat. No. 2,308,315, issued to Smith, discloses an automobile accessory seat designed specifically for a child. The seat is crude by modern standards because of its cumbersome size and design and has the capability to manually tilt the back of the seat and raise a non-adjustable footrest. The accessory seat is also designed to be foldable and easily stored for added convenience.

U.S. Pat. No. 4,205,877, issued to Ettridge, discloses a more modern children's car seat. This particular car seat is held in place on a regular automobile seat with a safety belt. The car seat is adjustable from an upright position into a reclining sleeping position. The adjustment is easily made by a linkage system that is operated by a simple handle. A non-adjustable footrest is provided as part of the invention.

U.S. Pat. No. 4,274,674, issued to Deloustal, also discloses a car seat for a child with a non-adjustable footrest. This particular car seat is reclinable into various different positions. The positions can be changed with the adjustment of a rotatable attachment handle assembly.

U.S. Pat. No. 4,762,331, issued to Tucker et al., discloses the use of a combination car seat and stroller. The stroller is provided with pivotable wheels, with a spring or clip being provided for locking the wheels into place in the stroller embodiment. Slots in the arms of the car seat embodiment are provided to engage the seatbelt of an automobile or airplane. A selectably extendable footrest is also provided for in the car seat embodiment of the invention.

U.S. Pat. No. 4,858,997, issued to Shubin, discloses the use of an adjustable car seat provided with a pivoted tray that comes over the top of the child being seated. Shoulder and lap straps automatically come into position to hold the child in place. As the child gets older and bigger, the position of the shoulder straps may be raised and adjusted as needed. The seat and back may also be tilted as a unit by raising the front of the seat so the child can recline and sleep.

U.S. Pat. No. 5,505,519, issued to Natt, describes the use of fitted leg rest attachments for existing child car seats. The fitted leg rest is made up of a leg pad and two extension bars attached to a set of springs which can raise or lower the leg pad in an angular plane outside of the car seat. This particular leg rest attachment can be retrofitted onto most types of car seats.

U.S. Pat. No. 5,524,964, issued to Weimersheimer, describes a child restraint car seat and bed. The device is interchangeable between being an upright car seat and a reclinable flatbed. While in the upright car seat position, a retractable footrest is slidably deployable from the interior of the base assembly. The backrest can be secured in any position of rotation relative to the assembly.

Several of the devices outlined in the above patents are provided with some form of footrest for the child. These footrests, however, are not adjustable enough to account for the different sizes of babies and small children. The presence of a footrest is not useful if it cannot be properly fitted to the child sitting in the car seat. That's what is really needed, a car seat that is provided with a properly fitting and adjustable footrest. It would also be quite useful if such a device could be retrofitted on currently existing car seats as well as being furnished as an item of original equipment manufacture (OEM) on new car seats.

None of the above inventions and patents, taken either singularly or in combination, is seen to describe the instant invention as claimed. Thus an adjustable footrest for a car seat solving the aforementioned problems is desired.

SUMMARY OF THE INVENTION

The invention is an adjustable footrest for a child safety car seat. The adjustable footrest can be permanently attached, with screws and bolts, to a given car seat. The adjustable footrest has a vertical plate and a horizontal plate that can be swung into place with the use of ball bearing turning spools. The horizontal plate can be further adjusted in relation to the vertical plate with the use of a spring loaded dowel and a plurality of alignment apertures on the vertical plate. This enables the adjustable footrest to be adjusted to each individual child that sits in it.

Accordingly, it is a principal object of the invention to provide an adjustable footrest that will relief pressure behind the knees therefore increasing the comfort and circulation of a child that is seated in a given car seat that utilizes such a footrest.

It is another object of the invention to provide child safety car seat assembly having an adjustable footrest retrofitted to the child safety car seat.

It is another object of the invention to provide child safety car seat and an adjustable footrest manufactured as a unitary item.

It is a further object of the invention to provide a footrest that can be swung into a variety of positions and angles directly below a given car seat that uses such a footrest.

Still another object of the invention is to provide an adjustable footrest that can be adjusted to the height and size of a child sitting in a given car seat that is utilizing the adjustable footrest.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
FIG. 1 is an environmental, perspective view of an adjustable footrest for a child safety car seat according to the present invention.

The present invention is an adjustable footrest 10 for a child safety car seat 20, as depicted in FIG. 1.

Figure 2:
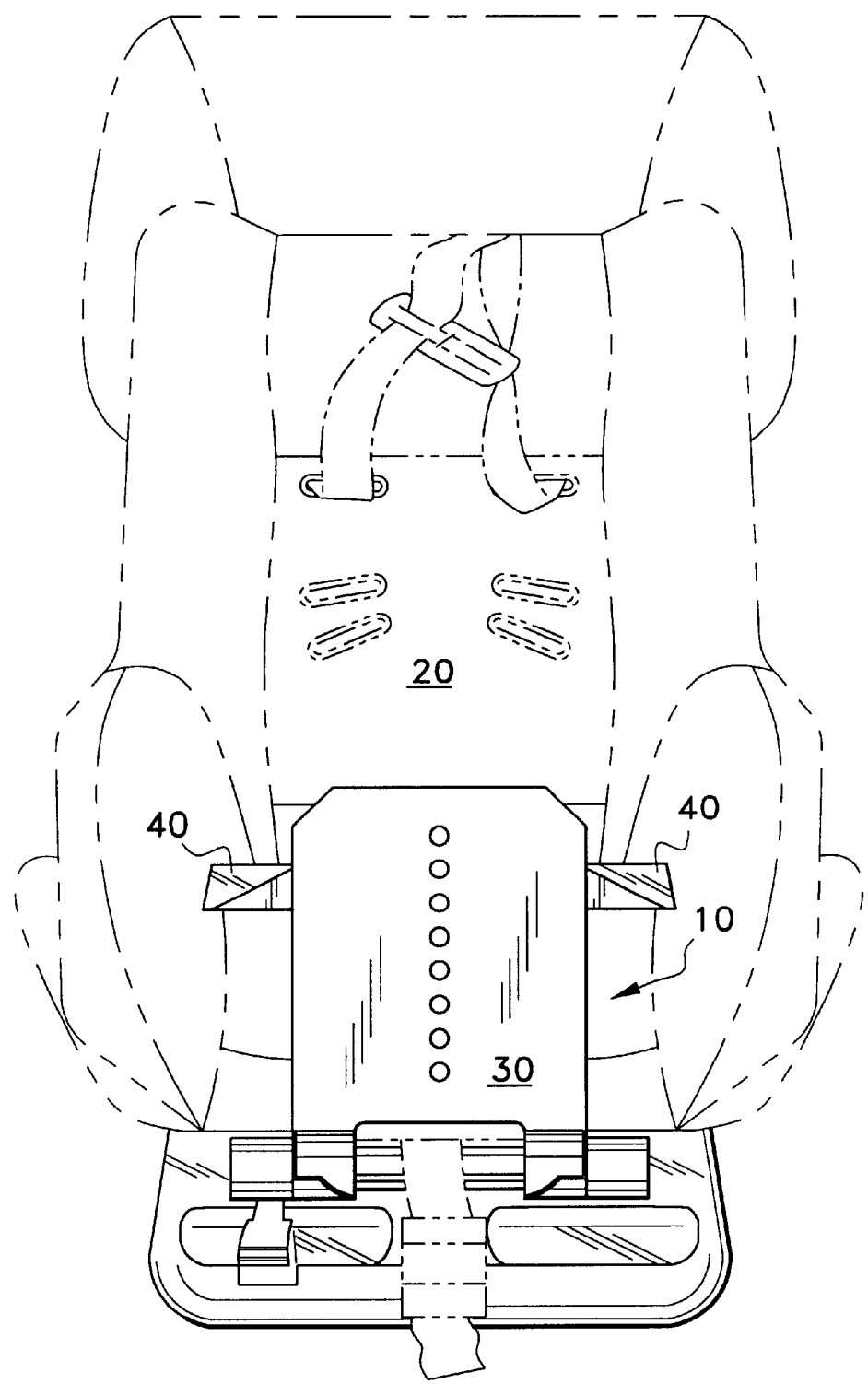
FIG. 2 is a front view of an adjustable footrest for a child safety car seat with the horizontal plate rotated to an up position for storage.

The adjustable footrest 10 is comprised of a vertical plate 30 that extends downward from the front edge of the car seat 20, a horizontal plate 40 to be perpendicularly attached to and slidable on the vertical plate 30, an attaching means for attaching the adjustable footrest 10 to a car seat 20, an adjusting means for adjusting the horizontal plate 40 in relation to the perpendicularly attached vertical plate 30 forming the adjustable footrest 10 and a rotating means for rotating the vertical plate 30 and horizontal plate 40 at a desired angle at the top corners of the vertical plate 30. These components of the adjustable footrest 10 are illustrated in FIG. 2.

Figure 3:
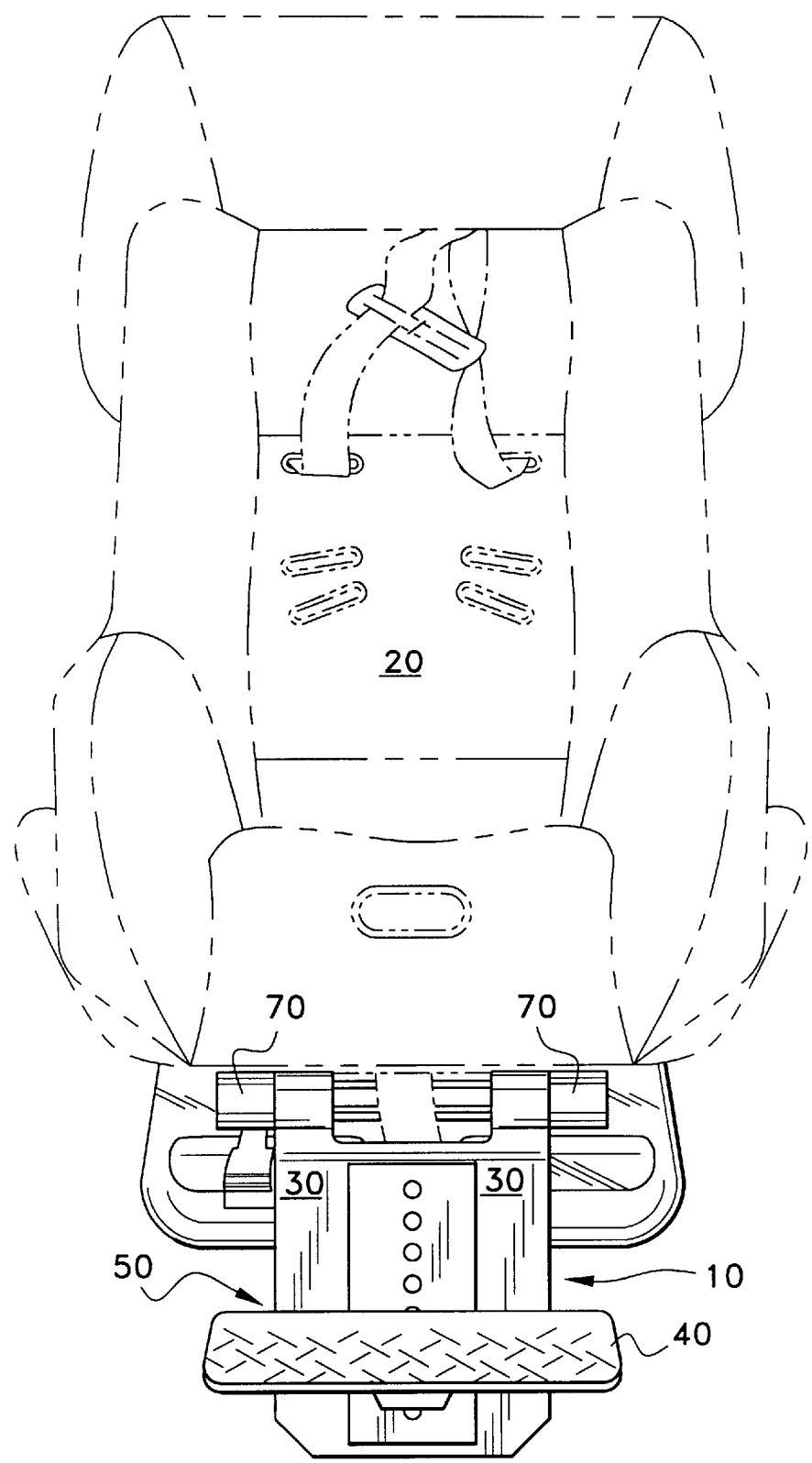
FIG. 3 is a front view of an adjustable footrest for a child safety car seat with the horizontal plate rotated to a down position for use.

FIG. 3 is a front view of the adjustable footrest 10 being in the down position, which can be set by grasping the horizontal plate 40 and rotating the combined horizontal and vertical plate assembly 50 downward. The top surface of the horizontal plate 40 has raised or knurled treads for easy traction. A young child that is sitting in the car seat 20 should be able to comfortably rest his feet on the top surface of the horizontal plate 40, as opposed to letting the child hang his feet loosely downward. This effects the circulation to the child's feet and in turn effects his comfort level.

Figure 4:
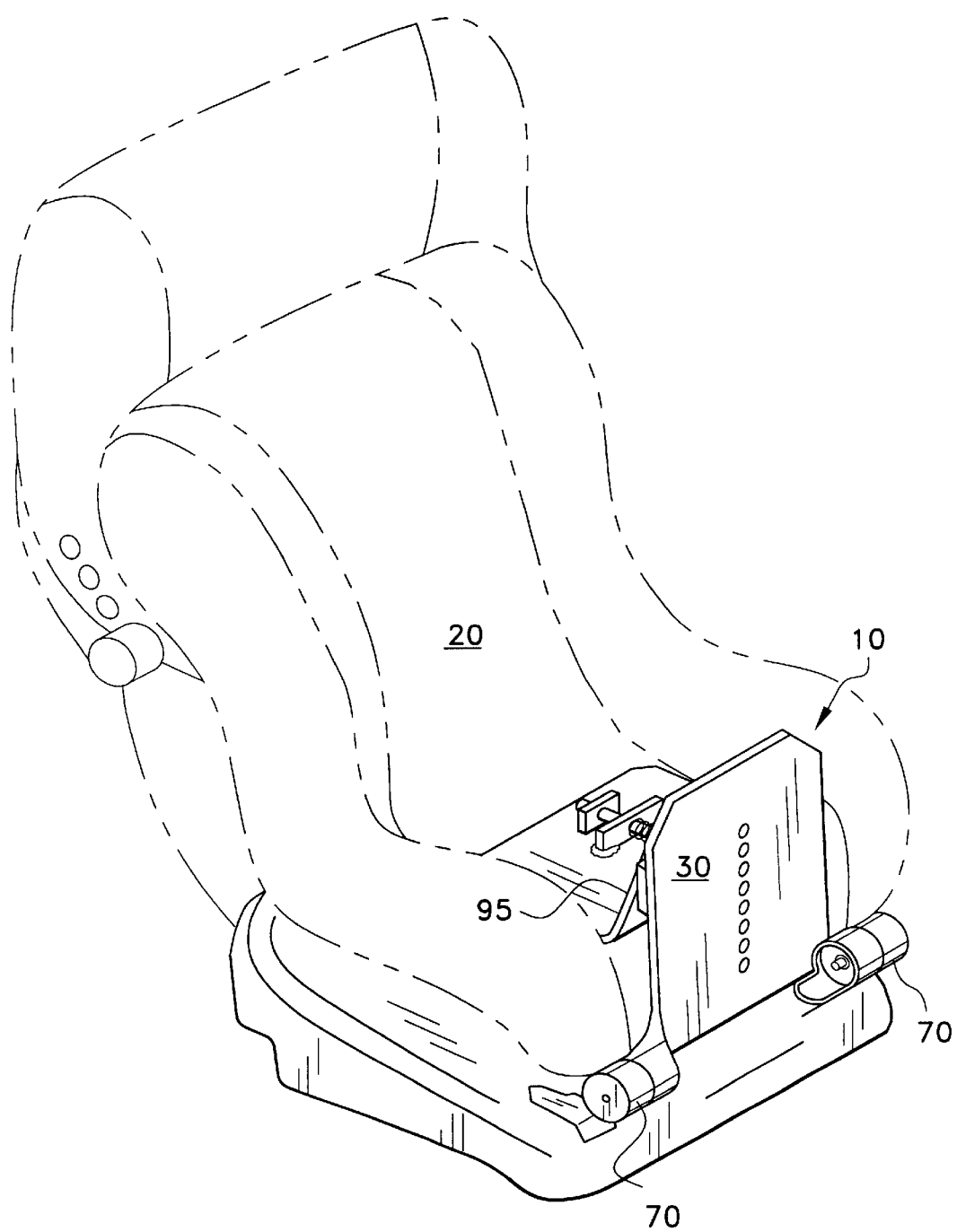
FIG. 4 is a side view of an adjusting means for height and size adjustment of an adjustable footrest for a child safety car seat.

The adjustable footrest 10 can be retrofitted to accommodate currently used car seats 20 without footrests. The attaching means for attaching the adjustable footrest 10 to a car seat 20 are common screws or bolts. Sheet metal extensions (not shown) with holes to accommodate fastening screws or bolts (not shown) extend from the turning spools or hinges 70, which are set underneath the edge of the car seat 20. The screws or bolts can be inserted through the holes to permanently attach the adjustable footrest 10 to a plastic underframe of a given car seat 20. This is depicted in FIG. 4.

A novel feature of the adjustable footrest 10 is the ability to adjust the horizontal plate 40 to accommodate different sized small children and infants that will use the adjustable footrest 10. The adjusting means for adjusting the horizontal plate 40 in relation to the perpendicularly attached vertical plate 30 forming the adjustable footrest 10 is a spring-loaded dowel 80 extending into one of a plurality of alignment apertures 90.

Figure 5:
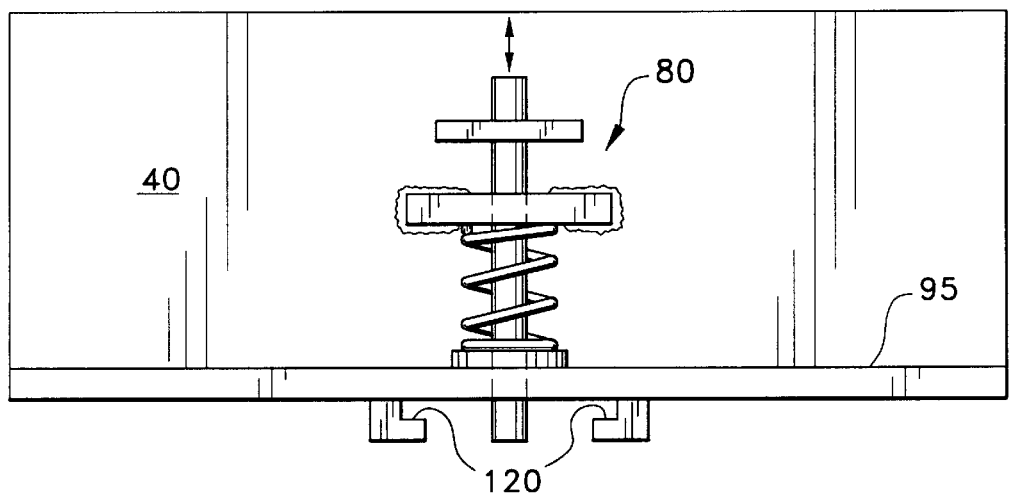
FIG. 5 is a bottom view of a spring loaded dowel and attaching tabs on the horizontal plate of an adjustable footrest.
Figure 6:
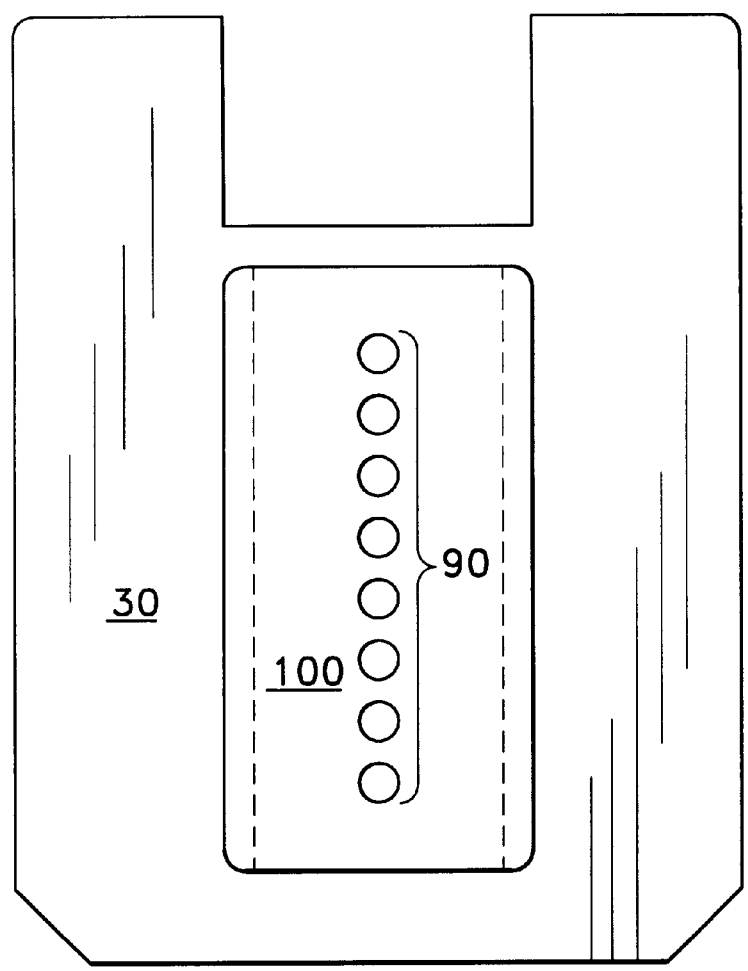
FIG. 6 is a front view of a vertical plate and raised plateau of an adjustable footrest.
Figure 7:
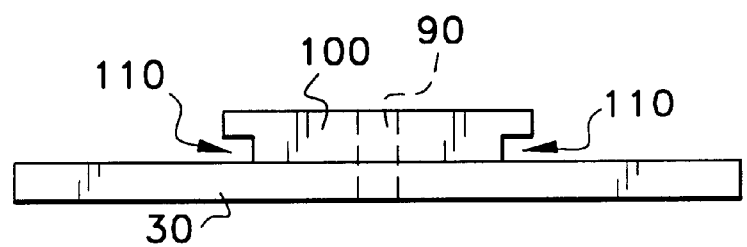
FIG. 7 is a bottom view of an adjustable footrest, raised plateau and grooves on the sides of the raised plateau.

The plurality of alignment apertures 90 are defined in a back plate 100 that is fixedly attached to and spaced apart from the vertical plate 30. This is illustrated in FIG. 5, FIG. 6 and FIG. 7. A pair of parallel, longitudinally extending grooves 110 are formed between the overhanging side edges of the back plate 100 and the vertical plate 30. The horizontal plate 40 has a rear plate 95 (seen in FIGS. 4 and 5 depending from its rear edge and normal to the horizontal plate 40. A pair of tabs 120 project from the rear plate 95 and define a slot or channel. The tabs 120 slidably engage the grooves 110, while the back plate 100 is slidably disposed in the channel defined by the tabs 120. Hence, the horizontal plate 40 is disposed normal to the vertical plate 30, but is slidable up and down the vertical plate 30.

The spring loaded dowel 80 is placed on the underside of the horizontal plate 40 and is also aligned with the plurality of alignment apertures 90. The spring loaded dowel 90 can be pinched to retract the end of the spring loaded dowel 80 out of one of the plurality of alignment apertures 90. Once retracted, the horizontal plate 40 may be moved perpendicularly up and down the raised back plate 100. The spring loaded dowel 80 can also be released and engaged to fit into one of the plurality of alignment grooves 110 to hold the horizonal plate 40 in place at a particular perpendicular spot on the raised back plate 100 and vertical plate 30.

There is also a rotating means for rotating of pivoting the vertical plate 30 and horizontal plate 40 at a desired angle at the top corners of the vertical plate 30. The rotating means is a pair of turning spools 70 that can hold the top ends of the vertical plate 30 and rotate the outer edge of the vertical plate 30 and the horizontal plate 40 to a manually adjusted angle to the turning spools 70. This pair of turning spools 70 can hold the vertical and horizontal plate assembly 50 at a desired angle between the edge of the car seat 20 and vertical plate 30. This type of "turning spoc,l" technology involves the use of ball bearing based turning spools 70 that are not novel and are well-known to those schooled in the related art.

Operation of the adjustable footrest 10 is straightforward. The adjustable footrest 10 is permanently attached to the edge of the car seat 20 using common screws or bolts with the sheetmetal extensions with holes, as previously discussed. Once installed, the horizontal and vertical plate assembly 50 can be swung into a desired position below the adjustable footrest 10. Once swung into place, the user can use the spring loaded dowel 80 to slide the horizontal plate 40 into a position that is comfortable for the child seated in the car seat 20.

It is to be understood that the present invention is not limited to the embodiment described above, but encompasses any and all embodiment within the scope of the following claims.

We claim:

1. A child safety car seat assembly comprising:

a child's car seat including a front edge; and an adjustable footrest structure depending from said car seat, said footrest structure including:

an elongated first plate vertically depending from said car seat, said first plate having a front surface and a top edge pivotally connected to the front edge of said car seat;

a vertically extending second plate centrally affixed to the front surface of said first plate, said second plate having a plurality of vertically aligned apertures;

a spring-loaded dowel structure slidably engaging said second plate; and a horizontal third plate fixedly attached to said dowel structure, said horizontal third plate extending perpendicularly from the front surface of said first plate to define a footrest;

whereby, said elongated first plate is pivotally adjustable and said horizontal third plate is vertically adjustable.

2. A child safety car seat assembly according to claim 1, wherein said horizontal third plate include a top surface having knurled treads.

3. A child safety car seat assembly according to claim 1, wherein said first plate is pivotally connected to the front edge of said car seat by a pair of turning spools.

* * * * *